United States Patent [19]

Stark et al.

[11] Patent Number: 5,021,537

[45] Date of Patent: Jun. 4, 1991

[54] POLYACETOACETATE-CONTAINING EPOXY RESIN COMPOSITIONS

[75] Inventors: Charles J. Stark; Rita D. Pietruszka, both of Houston, Tex.

[73] Assignee: Shell Oil Company, Houston, Tex.

[21] Appl. No.: 515,904

[22] Filed: Apr. 27, 1990

[51] Int. Cl.$^5$ .................. C08G 59/56; C08G 59/40
[52] U.S. Cl. .................. 528/106; 523/454; 528/93; 528/111; 528/121; 528/124; 528/220
[58] Field of Search ............. 528/106, 220, 93, 111, 528/121, 124; 523/454

[56] References Cited

U.S. PATENT DOCUMENTS

| | | | |
|---|---|---|---|
| 3,053,804 | 9/1962 | Caldwell et al. | 528/220 |
| 4,016,141 | 4/1977 | Ritz et al. | 528/125 |
| 4,456,514 | 6/1984 | Misawa et al. | 204/180.8 |
| 4,598,108 | 7/1986 | Hoefs | 523/411 |
| 4,737,530 | 4/1988 | Hoefs et al. | 523/414 |
| 4,772,680 | 9/1988 | Noomen et al. | 528/229 |
| 4,791,152 | 12/1988 | Adeney et al. | 523/406 |

OTHER PUBLICATIONS

Rector et al., "Applications for Acetoacetyl Functionality in Thermoset Coatings", (1988).

*Primary Examiner*—Earl Nielsen

[57] ABSTRACT

A coating composition is provided comprising an epoxy resin, a polyacetoacetate, a curing agent for the epoxy resin, and an optional organic solvent. The presence of the polyacetoacetate permits the preparation of a fast-drying high-solids coating formulation.

22 Claims, No Drawings

POLYACETOACETATE-CONTAINING EPOXY RESIN COMPOSITIONS

BACKGROUND OF THE INVENTION

This invention relates to epoxy resin coating formulations. In one aspect, the invention relates to high-solids epoxy-based coating formulations which are curable by multifunctional amine curing agents.

High-performance coatings for protection of metal surfaces of ships, aircraft, bridges and other structures exposed to corrosive environments must be resistant to the corrosive effects of water and solvents. Excellent coating properties can be obtained from the use of solvent-borne, two-package epoxy coatings cured with amine curing agents.

To achieve sufficiently low viscosity to apply high-performance coating formulations, low molecular weight solid epoxy resins may be diluted with solvents. Prohibitions on the use of large quantities of certain solvents for this purpose, however, make it necessary to develop alternate approaches to reducing the viscosity of epoxy-based coating formulations.

A conventional technique for viscosity reduction is the addition of a diluent such as dibutyl phthalate, butyl glycidyl ether, cresyl glycidyl ether or aliphatic alpha alcohol glycidyl ether. Such diluents, however, can adversely affect coating properties and in some instances contribute to the volatile organic compound (VOC) content of the coating. Alternatively, a lower molecular weight liquid epoxy resin and blends of such resins with solid epoxy resins may be employed to reduce the volatile content of coating formulations. A related approach includes the use of low viscosity, non-volatile curing agents to reduce coating formulation viscosities.

While all of these approaches reduce the viscosity of the coating formulation, they have a tendency to increase the dry time of the resulting coatings. High-performance coatings for metal surfaces of large structures such as bridges must be cured under ambient conditions, as the application of heat over such a large surface is not practical. Ambient-cure dry time is therefore a very important consideration, because a tacky coating picks up dust and is easily marred.

It is therefore an object of the invention to provide a high-solids epoxy-based coating formulation. It is an object of a specific aspect of the invention to provide high-solids epoxy-based formulations curable by a variety of multifunctional amine curing agents. It is a further object to provide a high-solids coating composition which dries rapidly.

SUMMARY OF THE INVENTION

According to the invention, a composition is provided comprising an epoxy resin and a polyacetoacetate. In one embodiment, a high-solids coating formulation is provided comprising an epoxy resin, a polyacetoacetate, a curing agent and an optional organic solvent. The presence of the polyacetoacetate provides a high-solids coating having shortened dry times.

DETAILED DESCRIPTION OF THE INVENTION

The invention coating formulation contains an epoxy resin. The epoxy resin can be any curable epoxy resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Particularly suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein the average n is zero or a number greater than 0, commonly in the range of 0 to 10, preferably in the range of 0 to 2. Other suitable epoxy resins can be prepared by

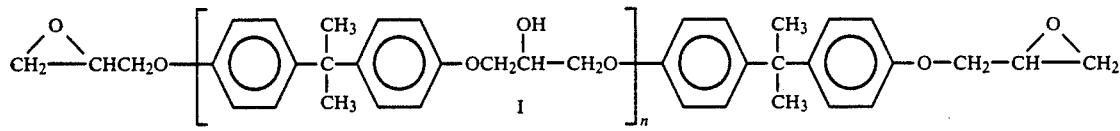

the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as polypropyleneglycol and trimethylolpropane.

Epoxy resins suitable for high-solids coating formulations have molecular weights generally within the range of 100 to about 4,000, preferably about 200 to about 1500. The commercially available epoxy resin EPON ® Resin 826, a reaction product of epichlorohydrin and 2,2-bis(4-hydroxyphenyl)propane (bisphenol-A) having a number average molecular weight of about 350, an epoxide equivalent weight (ASTM D-1652) of about 178–185, and an average n value in formula I above of about 0.1, is an example of a suitable epoxy resin for such coating formulations. Such low molecular weight resins can also be saturated, as is the case when the starting hydroxyl group-containing compound is hydrogenated bisphenol-A. Such saturated resins provide high-performance coatings but typically suffer from long dry times.

Also favored in high-solids coating formulations, because of the superior coating properties of the resin, are advanced polyglycidyl ethers of polyhydric phenols obtained by the catalyzed reaction of an epoxy resin of relatively low molecular weight with a phenolic compound to produce an epoxy resin having a higher molecular weight. Such an epoxy resin is commercially available from Shell Chemical Company as EPON ® Resin 834, a product of the catalyzed advancement reaction of EPON ® Resin 828 with bisphenol-A. EPON ® Resin 834 has a number average molecular weight of about 505 and an epoxide equivalent weight of about 230–280.

The invention composition includes a polyacetoacetate having from two to four functional groups of the formula

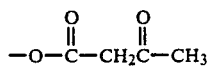

and a molecular weight within the range of about 200 to about 800. Such polyacetoacetates include, for example, the bisacetoacetates of dipropylene glycol, ethylene glycol and neopentyl glycol; the trisacetoacetates of trimethylolpropane, trimethylolethane, glycerol and bis(trimethylolpropane); and the tetrakis acetoacetate of pentaerythritol. The preferred polyacetoacetates are trisacetoacetates because of their non-volatility and their demonstrated ability to impart low viscosity and rapid dry times to high-solids coatings.

The polyacetoacetate will generally be present in the coating formulation in an amount effective to reduce the viscosity of the epoxy resin, generally at least about 1 weight percent, preferably within the range of about 2 to about 75 weight percent, preferably from about 4 to about 40 weight percent, based on the weight of the epoxy resin.

The invention coating formulation will include a curing agent for the epoxy resin. Curing agents which are particularly suitable for use in high-solids ambient-cure coating systems include aliphatic polyamines, cycloaliphatic amines, aromatic amines, Mannich bases, ketimines, oxazolines, amidoamines, and modified polyamine resins prepared by reacting aliphatic or cycloaliphatic polyamines with compounds containing functional groups which react with the amine group, such as glycidyl ether-containing or carboxy-containing compounds. Reaction products of polyamines with glycidyl ether-group containing compounds are known as "polyamine-epoxy adducts." Reaction products of dicarboxylic acids and polyamines are known as "polyamide resins." The latter are usually prepared by condensation of the dicarboxylic acid with excess amounts of polyalkylene polyamines. Polyamides based on dicarboxylic acids having more than 10 carbon atoms, particularly those based on $C_{36}$ dicarboxylic acids, are preferred because of the water resistance and flexibility of the resulting coatings. Suitable modified polyamine resins are commercially available from the Pacific Anchor Chemical Corporation as Ancamide ® amidoamine and polyamide resins, and from Henkel Corporation as Versamid ® polyamide resins.

The final coating formulations can optionally include additional non-reactive diluents such as dibutyl phthalate or reactive diluents such as monoepoxies (butyl glycidyl ether and cresyl glycidyl ether, for example) and epoxy resins (vinyl cyclohexene dioxide and triglycidyl ether of trimethylol propane, for example).

The final coating formulation will include sufficient solvent liquids to reduce the viscosity of the formulation to a level permitting application to a surface as a coating. For some applications, it may be desirable to apply a coating formulation which does not include an organic solvent. Organic solvents such as alcohols; aliphatic, naphthenic and aromatic hydrocarbons; ethers; esters; and ketones can be employed. Specific examples of such organic diluents include ethyl alcohol, isopropyl alcohol, butyl alcohol, the monomethyl ether of diethylene glycol, ethylene glycol of monobutyl ether, tetrahydrofuryl alcohol, ethylene glycol monomethyl ether, ethyl acetate, isopropyl acetate, butyl acetate, amyl acetate, acetone, methyl ethyl ketone, methyl isobutyl ketone, diisobutyl ketone, hexane, heptane, octane, methyl cyclohexane, xylene, and the like. Ketones are the preferred organic solvents.

The final coating formulation can include conventional coating additives such as accelerators; fillers and extenders, such as silica, mica, quartz, cryolite, Portland cement, limestone, atomized alumina, barytes, talc, zinc powder, pyrophyllite, clay, diatomaceous earth; pigments, such as titanium dioxide, red lead, basic lead silica chromate, basic zinc chromate, zinc, zinc oxide, lead, barium and strontium chromates, calcium plumbate, barium metaborate, and calcium, strontium and zinc molybdates; and resinous modifiers, such as phenolic resins, urea resins, melamine resins, acrylic resins, polyester resins, vinyl resins, bituminous resins, and polystyrene.

Coating compositions according to the invention can be provided as a two-container system. The first container contains the epoxy resin component and the second container contains the curing agent for the epoxy resin. Any diluents used may be incorporated into either component, although any amine-reactive diluents are preferably provided with the resin component. Any solvents used and additives such as pigments can be included in either or both containers.

When the final coating formulation is prepared by mixing all components, the amount of the curing agent added to the epoxy resin will be that amount which is effective to cure the epoxy resin and the polyacetoacetate under the selected coating/curing conditions. Generally, the amount will be approximately stoichiometric, so that there is about 0.5 to about 1.5 reactive NH group for each epoxy group and each acetoacetate functional group present.

The high-solids coating formulation will generally include a polyacetoacetate in an amount of at least about 1 weight percent, generally about 2 to about 75 weight percent, and preferably about 2 to about 40 weight percent, based on the weight of the epoxy resin. The coating formulation may include an organic solvent, generally present in an amount of about 0 to about 50, preferably about 0 to about 40, weight percent, based on the weight of the formulation.

The coating composition can be applied by conventional coating methods such as brush-coating, spray coating and air coating. Curing can be generally carried out by exposure of the applied composition to ambient conditions for one hour to one week.

EXAMPLE 1

This example describes the preparation of the trisacetoacetate of trimethylolpropane. 235g of diketene were added to 125g of 2-ethyl2-(hydroxymethyl)-1,3-propanediol containing 0.362g of 4-(dimethylamino) pyridine at 60° C. over a period of one hour, and stirring at 60° C. was continued for an additional hour.

EXAMPLE 2

For film performance comparison, a formulation representative of the binder system of a typical commercial solvent-borne epoxy-based ambient-cure coating was prepared and tested. This clear coating formulation was prepared by roll blending, over a 30-minute induction period at 77° F., the following constituents: 24.50 parts by weight of a solid diglycidyl ether of bisphenol-A having an EEW of 525–550; 25.36 parts of a 1:1:1 (weight) solvent blend of methyl isobutyl ketone (MIBK), propylene glycol monomethyl ether and xylene; 18.90 parts of EPON ® CURING AGENT V-15, a polyamide resin having an amine value of 230-246 as a 70% solution in a 1:1 (weight) blend of xylene and isopropyl alcohol; and 0.19 parts SR882 (General Electric Company), a 60% solids solution of a silicon resin flow control agent in xylene. The final formulation weight percent solids (calculated) was 55%. The calculated volatile organic compound (VOC) content of this clear coating formulation was 3.8 lb/gal.

The formulation was applied to cold-rolled steel panels using a wire-wound drawdown bar to provide a dry film thickness of 1.1±0.3 mil. Drying, curing and evaluations were carried out at a temperature of 77° F. and humidity of 55%. Panels were aged for 9-12 days. The results of film performance tests are shown in Table 1.

EXAMPLE 3

For coating VOC comparison, a high-solids coating formulation based on a low-viscosity epoxy was prepared by roll-blending, over a 30-minute induction period at 77° F., the following constituents: 25.00 parts by weight of a liquid diglycidyl ether of bisphenol-A (DGEBPA) having an EEW of 185-192; 14.66 parts of a 9:1 blend of MIBK and methyl normal amyl ketone (MNAK); 18.75 parts of Versamid ® 140 (Henkel Corporation), a polyamide resin having an amine value of 370-400; and 0.22 parts SR882 flow control ageni. The final formulation had a calculated weight percent solids content of 75% and a calculated VOC of 2.1 lb/gal of coating. Examples 5 through 9, which were based on non-volatile resins of similar densities, at 75 weight percent solids in the same solvent system, had identical calculated VOC's. However, the film formed from the formulation of Example 3 had a longer dry time than films from the relatively high VOC formulation of Example 2.

EXAMPLE 4

A formulation similar to that of Example 3 was prepared, except that a blend of 21.25 parts of the DGEBPA and 3.75 parts of methyl acetoacetate were used in place of 25.00 parts of the DGEBPA. The presence of the monoacetoacetate lowered the flash temperature of the resin. In addition, methyl acetoacetate volatilized at 110° C. (ASTM D-2369) and thus would be expected to contribute to increased VOC. The calculated VOC for this clear coating was 2.6 lb/gal. The presence of the monoacetoacetate did not improve film dry time.

EXAMPLE 5

A formulation similar to that of Example 4 was prepared except that the monoacetoacetate of 1-octanol was used in place of methyl acetoacetate. The presence of this monoacetoacetate provided for a higher flash temperature than that of the resin of Example 4; however, it did not improve the dry time of the film, and its impact resistance was greatly reduced relative to that of Example 3.

EXAMPLE 6

A formulation similar to that of Example 4 was prepared except that the trisacetoacetate of trimethylolpropane was used in place of methyl acetoacetate. As can be seen from Table the presence of the trisacetoacetate lowered dry time to a level comparable to that of the standard of Example 2, while maintaining a relatively high resin flash point.

EXAMPLE 7

A formulation similar to that of Example 4 was prepared except that the bisacetoacetate of dipropylene glycol was used instead of methyl acetoacetate. This resin blend exhibited a relatively high flash point. Film dry times were longer than those of the standard of Example 2 but were shorter than those of Examples 4 and 5, which did not contain polyfunctional acetoacetates.

EXAMPLE 8

A formulation similar to that of Example 5 was prepared except that a blend of 17.50 parts of the diglycidyl ether and 7.50 parts of the monoacetoacetate of 1-octanol was used. As can be seen in Table 1, increasing the amount of the monoacetoacetate resulted in even longer dry times and poor impact resistance. Solvent and water resistance were compromised as well.

EXAMPLE 9

A formulation similar to that of Example 8 was prepared except that the trisacetoacetate of trimetholpropane was used instead of the monoacetoacetate of 1-octanol. Increasing the amount of the trisacetoacetate resulted in a further reduction of dry times.

EXAMPLE 10

A comparison high-solids coating fcrmula(ion was prepared by roll-blending, over a 30-minute induction period at 77° F., the following ingredients: 30.00 parts of a diglycidyl ether of a hydrogenated bisphenol-A (DGEHBPA) having an EEW of 210-238 (flash point 240° F.); 17.40 parts of Versamid ® 140 polyamide resin; 11.75 parts of a 9:1 blend of MIBK and MNAK; and 0.40 parts of SR882 flow control agent. The final formulation had a solids content (calculated) of 80%. The clear coating had a calculated VOC of 1.7 lb/gal of coating. Examples 11"13 had identical calculated VOC's.

As can be seen from Table 1, a film prepared from the hydrogenated resin had very long dry time.

EXAMPLE 11

A formulation was prepared as in Example 10 except that a blend of 28.50 parts of the epoxy resin and 1.50 parts of the trisacetoacetate of trimethol propane was used. As can be seen in Table 1, inclusion of the trisacetoacetate reduced the dry time of films prepared from the formulation. Impact resistance and water resistance were superior to those of the film of Example 10.

EXAMPLE 12

A formulation was prepared as in Example 10 except that a blend of 27.00 parts of the diglycidyl ether and 3.00 parts of the trisacetoacetate of trimethylol propane was used. Dry time was further reduced and water resistance was improved.

EXAMPLE 13

A formulation was prepared as in Example 10 except that a blend of 25.50 parts of the diglycidyl ether and 4.50 parts of the trisacetoacetate of trimethylol propane was used. As can be seen from Table 1, increasing the amount of the trisacetoacetate resulted in significant reduction in dry time, while the flash points of the resins remain above 200° F. In comparison to coatings from the DGEHBPA formulation of Example 10, the dust-free dry time for this formulation was 87% lower, while the VOC remained 1.7 lb/gal. Dust-free dry time was 55% lower than that of the standard of Example 2, which had a VOC of 3.8 lb/gal of coating.

EXAMPLE 14

Formulations based on the resin/acetoacetate systems of Examples 2, 3, 6 and 9 were prepared. Each formulation contained 45% by weight of solvent. A clear coating based on the binder of Example 2 was prepared by roll blending over a 30-minute induction period at 77° F. the following constituents: 24.57 parts by weight of the epoxy resin, 0.06 parts of SR882, 13.27 parts of EPON CURING AGENT ® V-15 and 30.96 parts of Solvent A, a blend of 9:1 weight ratio of MIBK and MNAK. In the same way, coatings of 0.06 parts SR882, 15.00 parts Versamid ® 140 and 28.64 parts of Solvent A were made containing 20.00 parts of each of the following resin systems: EPON ® 828 (from Example 3), an 85:15 (wt) blend of EPON ® 828 with the trisacetoacetate of trimethylolpropane (from Example 6), and a 70:30 blend of EPON ® 828 with the trisacetoacetate of trimethylolpropane (from Example 9).

Similar formulations, but with 25% by weight of added solvent, were prepared in the same manner. The first contained 28.08 parts EPON ® 1001° F., 0.07 parts SR882, 15.16 parts EPON CURING AGENT ® V-15 and 14.40 parts of Solvent A. The next three contained 0.07 parts SR882, 18.75 parts Versamid 140, 14.57 parts Solvent A and 25.00 parts of each of the resin systems from Examples 3, 6 and 9.

The viscosity of each of these eight formulations was evaluated after induction. In addition, the percent weight nonvolatiles and the coating density were measured, and the true VOC content of each of these clear coatings was determined. The results are reported in Table 2.

These data show that, while the formulation based on the binder of Example 2 has an appropriate application viscosity with 45% solvent in the coating, its VOC content is quite high. The viscosities of the formulations based on the binders of Example 3 (EPON ® 828 with Versamid ® 140) and Example 6 (85:15 parts of EPON ® 828 and the trisacetoacetate of trimethylolpropane with Versamid ® 140) are much lower than needed in practical application at this same high VOC content. But at between 75% and 80% weight nonvolatiles, the binders of Examples 3 and 6 provide lower, acceptable viscosities similar to that of the Example 2 system at 45% added solvent. Thus, the binders of Examples 3 and 6 provide lower VOC contents; however, as pointed out earlier, the dry-time, an important property, is undesirably long for the coating of Example 3, while the coating of Example 6 has excellent dry time.

TABLE 1

| Example | 2 | 3 | 4 | 5 | 6 | 7 | 8 | 9 | 10 | 11 | 12 | 13 |
|---|---|---|---|---|---|---|---|---|---|---|---|---|
| RESIN BLEND: | | | | | | | | | | | | |
| Solid Resin: DGEBPA | 24.50 | — | — | — | — | — | — | — | — | — | — | — |
| Liquid Resin: DGEBPA | — | 25.00 | 21.25 | 21.25 | 21.25 | 21.25 | 17.50 | 17.50 | — | — | — | — |
| Liquid Resin: DGEHBPA | — | — | — | — | — | — | — | — | 30.00 | 28.50 | 27.00 | 25.50 |
| Acetoacetate Diluent: | | | | | | | | | | | | |
| Methyl Acetoacetate | — | — | 3.75 | — | — | — | — | — | — | — | — | — |
| 1-Octanol Acetoacetate | — | — | — | 3.75 | — | — | 7.50 | — | — | — | — | — |
| TMP Trisacetoacetate | — | — | — | — | 3.75 | — | — | 7.50 | — | 1.50 | 3.00 | 4.50 |
| DPG Bisacetoacetate | — | — | — | — | — | 3.75 | — | — | — | — | — | — |
| RESIN VISC., Gardner-Holdt (25° C.)[1] | Z+ | Z5+ | N– | T-U | Z2 | Y+ | D-E | Y+ | Z+ | X-Y | X | W |
| FLASH POINT, F[2] | <70 | 480 | 166 | 256 | 320 | 315 | 240 | 290 | 240 | 218 | 208 | 220 |
| FLOW CONTROL SR 882 | 0.19 | 0.22 | 0.22 | 0.22 | 0.22 | 0.22 | 0.22 | 0.22 | 0.40 | 0.40 | 0.40 | 0.40 |
| SOLVENT BLEND | | | | | | | | | | | | |
| 1:1:1 MIBK/PGME/Xylene | 25.36 | — | — | — | — | — | — | — | — | — | — | — |
| 90:10 MIBK/MNAK | — | 14.66 | 14.66 | 14.66 | 14.66 | 14.66 | 14.66 | 14.66 | 11.75 | 11.75 | 11.75 | 11.75 |
| CURING AGENT | | | | | | | | | | | | |
| EPON CURING AGENT V-15 | 18.90 | — | — | — | — | — | — | — | — | — | — | — |
| Versamid 140 | — | 18.75 | 18.75 | 18.75 | 18.75 | 18.75 | 18.75 | 18.75 | 17.40 | 17.40 | 17.40 | 17.40 |
| VISCOSITY, 25° C. at 30 min., | | | | | | | | | | | | |
| Gardner-Holdt[1] | I-J | E– | D | D-E | J-K | C | G+ | Q-R | E-F | I-J | L | Q-R |
| % Weight Added Solvent | 45 | 25 | 25 | 25 | 25 | 25 | 25 | 25 | 20 | 20 | 20 | 20 |
| DRY FILM THICKNESS, mils | 1.0 | 1.4 | 1.2 | 1.2 | 1.4 | 1.4 | 1.2 | 1.2 | 0.9 | 0.8 | 0.8 | 0.9 |
| DRY TIME, Hours[3] | | | | | | | | | | | | |
| Set to touch | 2.5 | 8 | 8.5 | 8.5 | 1.75 | 6 | 14.5 | 0.75 | 15.5 | 12.5 | 9 | 1.5 |
| Dust free | 5.5 | 11 | 12.25 | 12 | 5.5 | 10 | 22.5 | 2.25 | 19.5 | 16 | 13.5 | 2.5 |
| Through dry | 10.5 | 11.75 | 13.5 | 14.5 | 8 | 11.25 | >24.0 | 2.25 | 19.5 | 16.5 | 15 | 5.5 |
| PENCIL HARDNESS, pass[4] | 3H | 3H | 3H | 3H | 3H | 3H | 3H | 3H | 3H | 3H | 3H | 3H |
| FLEXIBILITY, in. passed[5] | ⅛ | ⅛ | ⅛ | ⅛ | ⅛ | ⅛ | ⅛ | ⅛ | ⅛ | ⅛ | ⅛ | ⅛ |
| ADHESION[6] | 5B | 3B | 3B | 5B | 3B | 4B | 3B | 5B | 5B | 4B | 5B | 4B |
| IMPACT RESISTANCE, pass[7] | | | | | | | | | | | | |
| Direct, in-lbs | 156 | 108 | 84 | 75 | 88 | 96 | 44 | 72 | 76 | 92 | 80 | 76 |
| Reverse, in-lbs | 160 | 124 | 68 | 60 | 76 | 92 | 76 | 76 | 68 | 68 | 60 | 64 |
| MIBK RESISTANCE, min pass[8] | 30 | 55 | 15 | 15 | 20 | 10 | 0 | 10 | 5 | 5 | 0 | 0 |
| WATER RESISTANCE, days pass[9] | 1 | 27 | 1 | 27 | 7 | 27 | 7 | 22 | 1 | 15 | 15 | 20 |

[1] ASTM D-1545: Bubble time
[2] ASTM D-93: Pensky-Martin closed cup method
[3] Gardner circular dry time recorder
[4] ASTM D-3363
[5] ASTM D-522: Conical mandrel
[6] ASTM D-3359: Cross hatch
[7] ASTM D-2794: Drop weight
[8] Time for pencil hardness to drop 2 units, after exposure to MIBK-soaked cotton ball, checking at 5-minute intervals
[9] ASTM D-870: Failure = first appearance of rust and/or blisters as small and as few as 9F.

TABLE 2

| Related Example | 2 | 3 | 6 | 9 |
|---|---|---|---|---|
| BINDER: | | | | |
| RESIN BASE: | Solid epoxy | Liquid epoxy | Liquid epoxy | Liquid epoxy |
| TMP Trisacetoacetate | None | None | 15%w | 30%w |
| CURING AGENT: | EPON CURING AGENT V-15 | Versamid 140 | Versamid 140 | Versamid 140 |
| 45% SOLVENT FORMULATIONS[1] | | | | |
| VISCOSITY[2], 25° C., 30 minutes | G− | A4 | A4+ | A3+ |
| NON-VOLATILES[3], % weight | 57.0 | 59.0 | 58.1 | 56.8 |
| DENSITY[4], lb/gal | 7.90 | 7.84 | 7.82 | 7.86 |
| VOC CONTENT[5], lb/gal | 3.4 | 3.2 | 3.3 | 3.4 |
| 75% SOLVENT FORMULATIONS | | | | |
| VISCOSITY[2], 25° C., 30 minutes | Z4+ | E+ | K− | U+ |
| NON-VOLATILES[3], % weight | 79.7 | 81.5 | 78.1 | 77.6 |
| DENSITY[4], lb/gal | 8.29 | 8.27 | 8.32 | 8.35 |
| VOC CONTENT[5], lb/gal | 1.7 | 1.5 | 1.8 | 1.9 |

[1]Solvent System 9:1 MIBK:MNAK
[2]ASTM D-1545
[3]ASTM D-2369
[4]ASTM D-1475
[5]ASTM D-3960

We claim:

1. A composition comprising:
   (a) a polyglycidyl ether having an average of at least about 1.5 epoxide groups per molecule and
   (b) a polyacetoacetate having two to four acetoacetate groups per molecule and a molecular weight within the range of about 200 to about 800.

2. The composition of claim 1 in which the polyacetoacetate is present in the composition in an amount of at least 1 weight percent, based on the weight of the polyglycidyl ether.

3. The composition of claim 2 in which the polyacetoacetate is a trisacetoacetate.

4. The composition of claim 2 in which the polyacetoacetate is a bisacetoacetate.

5. The composition of claim 3 in which the trisacetoacetate is present in the composition in an amount within the range of about 2 to about 75 weight percent, based on the weight of the polyglycidyl ether.

6. The composition of claim 5 in which the trisacetoacetate is selected from trisacetoacetates of trimethylolpropane, trimethylolethane, glycerol and bis(trimethylolpropane).

7. The composition of claim 2 in which the polyglycidyl ether is a diglycidyl ether of bisphenol-A and the polyacetoacetate is the trisacetoacetate of trimethylolpropane.

8. The composition of claim 7 in which the trisacetoacetate is present in an amount within the range of about 2 to about 75 weight percent, based on the weight of the diglycidyl ether.

9. The composition of claim 8 in which the trisacetoacetate is present in an amount within the range of about 4 to about 40 weight percent, based on the weight of the diglycidyl ether.

10. A composition comprising
    (a) a polyglycidyl ether having an average of at least about 1.5 epoxide groups per molecule,
    (b) a polyacetoacetate having two to four acetoacetate groups per molecule and a molecular weight within the range of about 200 to about 800, and
    (c) an effective amount of an amine curing agent.

11. The composition of claim 10 in which the polyacetoacetate is present in the composition in an amount within the range of about 2 to about 75 weight percent, based on the weight of the polyglycidyl ether.

12. The composition of claim 11 in which the polyacetoacetate is a trisacetoacetate.

13. The composition of claim 11 in which the polyacetoacetate is a bisacetoacetate.

14. The composition of claim 12 in which the trisacetoacetate is present in the composition in an amount within the range of about 4 to about 40 weight percent, based on the weight of the polyglycidyl ether.

15. The composition of claim 10 in which the amine curing agent is selected from the group consisting of polyamine-epoxy adducts, polyamines, cycloaliphatic amines, aromatic amines, polyamides, amidoamines and Mannich bases.

16. The composition of claim 10 which further comprises (d) up to about 50 weight percent, based on the weight of the composition, of an organic solvent.

17. The composition of claim 16 in which the organic solvent comprises a ketone.

18. The composition of claim 16 in which the polyacetoacetate is present in an amount within the range of about 4 to about 40 weight percent, based on the weight of the polyglycidyl ether.

19. The composition of claim 18 in which the polyacetoacetate is a trisacetoacetate and the polyglycidyl ether is a diglycidyl ether of bisphenol-A.

20. The composition of claim 19 in which the trisacetoacetate is selected from trisacetoacetates of trimethylolpropane, trimethylolethane, glycerol and bis(trimethylolpropane).

21. The composition of claim 19 in which the polyacetoacetate is a trisacetoacetate of trimethylolpropane.

22. The composition of claim 21 in which the amine curing agent is a polyamide resin.

* * * * *